(12) United States Patent
Mack

(10) Patent No.: US 9,978,100 B2
(45) Date of Patent: May 22, 2018

(54) METHOD AND SYSTEM FOR TRACKING PERSONAL PROPERTY COLLATERAL

(71) Applicant: Steven Mack, Las Vegas, NV (US)

(72) Inventor: Steven Mack, Las Vegas, NV (US)

(73) Assignee: CREDIOT, INC., Las Vegas, NV (US)

( * ) Notice: Subject to any disclaimer, the term of this patent is extended or adjusted under 35 U.S.C. 154(b) by 561 days.

(21) Appl. No.: 14/607,266

(22) Filed: Jan. 28, 2015

(65) Prior Publication Data

US 2016/0217525 A1   Jul. 28, 2016

(51) Int. Cl.
*G06Q 40/00* (2012.01)
*G06Q 40/02* (2012.01)

(52) U.S. Cl.
CPC .................. *G06Q 40/025* (2013.01)

(58) Field of Classification Search
CPC ...................................... G06Q 40/25
See application file for complete search history.

(56) References Cited

U.S. PATENT DOCUMENTS

| | | | |
|---|---|---|---|
| 7,946,485 | B2 | 5/2011 | Silverbrook et al. |
| 8,533,062 | B2 | 9/2013 | Sauerwein |
| 2008/0042868 | A1* | 2/2008 | Lee .................... G05B 19/0423 340/4.32 |
| 2008/0086410 | A1 | 4/2008 | MacGuire |
| 2010/0176933 | A1 | 7/2010 | Barragan Trevino et al. |
| 2010/0217697 | A1 | 8/2010 | MacGuire |
| 2012/0130909 | A1* | 5/2012 | Corn ...................... G06Q 10/06 705/303 |
| 2012/0226574 | A1 | 9/2012 | Sauerwein |
| 2013/0132268 | A1* | 5/2013 | Cooper ................ G06Q 40/025 705/38 |
| 2013/0297487 | A1 | 11/2013 | MacGuire |
| 2014/0006225 | A1 | 1/2014 | Bowman et al. |
| 2014/0032391 | A1 | 1/2014 | Kapur et al. |
| 2014/0032407 | A1 | 1/2014 | Kapur et al. |
| 2014/0279397 | A1* | 9/2014 | Schmidt ............... G06Q 40/025 705/38 |

* cited by examiner

*Primary Examiner* — Scott S Trotter
(74) *Attorney, Agent, or Firm* — Weide & Miller, Ltd.

(57) ABSTRACT

A tracking system is provided for tracking personal property, such as to track collateral which is used to secure a loan. Collateral belonging to a borrower, such as electronic devices or other items of personal property having a wireless communication interface, is placed in communication with a tracking system which receives information from those items of collateral and utilizes that information to verify the existence of the borrower's collateral.

19 Claims, 3 Drawing Sheets

METHOD AND SYSTEM FOR TRACKING PERSONAL PROPERTY COLLATERAL

FIELD OF THE INVENTION

The present invention relates to the identification and tracking of personal property, such as may be used as collateral for a loan.

BACKGROUND OF THE INVENTION

Personal property is frequently used as collateral for a loan. One problem with loaning money based upon such collateral is the risk to the lender that the borrower may sell, destroy or move the collateral. In the event of default on the loan, the lender may then find that the collateral is not available for collection. This presents a risk to the lender.

Pawn lenders have addressed this problem by requiring that the borrower turn over the personal property into their possession until the loan is paid in full. This is inconvenient for both the lender and the borrower, however. First, this requires that the lender expend resources to track and store the collateral, such as at a warehouse. Second, while the collateral is in the possession of the lender, it is not available for use by the borrower. This may deter the borrower from pawning their collateral in the first instance.

New solutions are desired to these problems.

SUMMARY OF THE INVENTION

Aspects of the invention comprise systems and methods for tracking collateral, such as personal property which is used to secure a loan.

In one embodiment of a system, items of collateral are placed in communication with a collateral tracking system. In a preferred embodiment, the items of collateral comprise electronic devices or other devices which include a communication interface which allows them to communicate with other devices. The communication interface might comprise, for example, a built-in wired or wireless communication interface which allows the device to be connected to a home computer or home network.

The collateral may communicate with the collateral tracking system via a collateral reporting device or via a communication interface or device. For example, a collateral reporting device may comprise a borrower's computer or other communication device, such as via a wireless access point or interface to the borrower's computer. As another example, the collateral may communicate with a communication interface or device, such as a router, which in turn links via one or more communication links to the collateral tracking system.

A tracking system is configured to receive information from the collateral, such as via the borrower's collateral reporting device or the communication interfaces or devices. The tracking system may comprise computing devices, such as one or more servers. The tracking system may include one or more databases which store borrower account information, including collateral information which is used to verify the collateral associated with the borrower's collateral reporting device.

In one embodiment of a method, a borrower may apply for a loan from a lender. The borrower may identify one or more items of collateral which may be used to at least partially secure the loan. The collateral might be identified by the borrower or it might be identified by using the tracking system to poll the borrower's collateral reporting device for potential items of collateral.

The borrower places items of collateral in communication with the tracking system. The lender may utilize the tracking system to receive information from the borrower's collateral and/or communicate with the borrower's collateral (directly through a communication interface or device or via the consumer's reporting device) regarding items of collateral. If the collateral which is used to secure the loan is identified, the collateral is verified as being secure. If items of collateral which are used to secure the loan are not identified, such as because the borrower sold or moved the items so that they are no longer in communication with the tracking system, the lender may contact the borrower, such as to call in the loan or obtain other collateral as security for the loan.

In one embodiment, the system of the invention may include or be implemented, at least in part, by a collateral reporting application which is downloaded on the borrower's collateral reporting device. The collateral reporting application may comprise computer executable program code which is used to facilitate tracking of collateral and reporting of collateral to a lender's tracking system. In other embodiments, the system may be implemented by a consumer providing home network or communication interface/device access information which allows the tracking system to communicate with the collateral via that network or those devices (enabling the tracking system to receive information from the collateral and/or transmit information to the collateral).

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a method and system for tracking personal property, such as personal property which is used as collateral for a loan.

Figure 1:
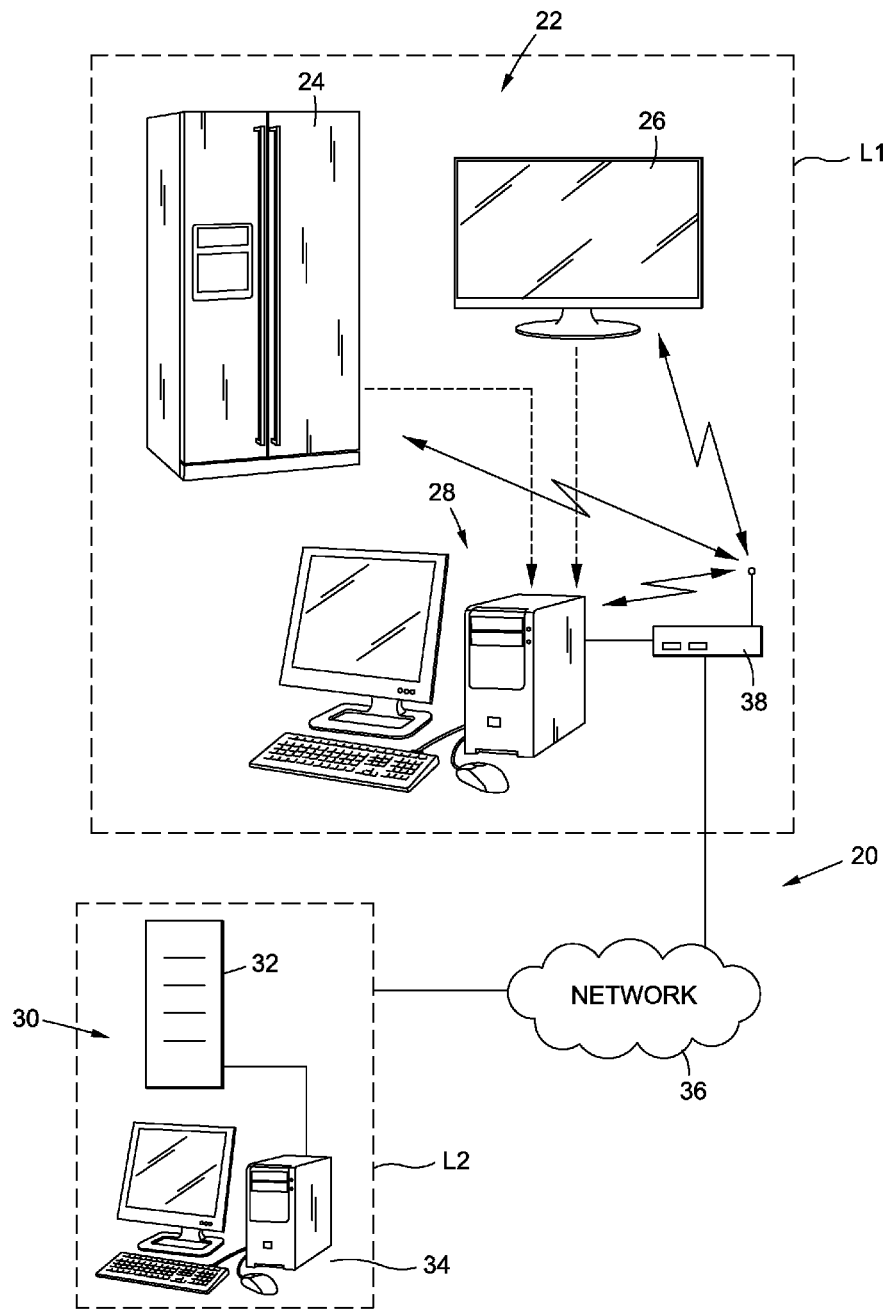
FIG. 1 is an overview of a system in accordance with one embodiment of the invention.
Figure 2:
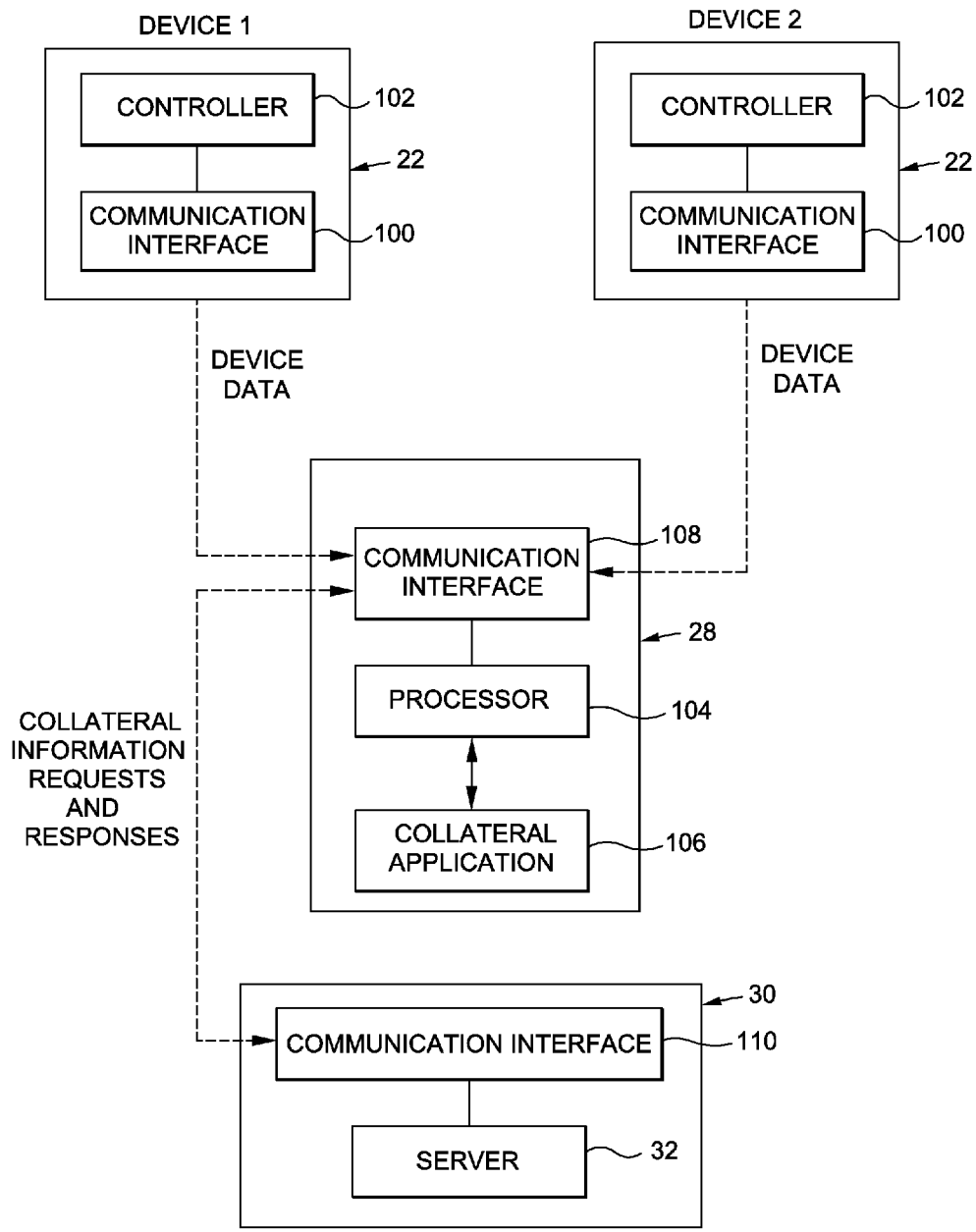
FIG. 2 is a diagram which illustrates more detail of the system illustrated in FIG. 1.

One embodiment of a system 20 of the invention will be described with reference to FIGS. 1 and 2. FIGS. 1 and 2 illustrate a system 20 for tracking personal property.

As illustrated in FIG. 1, one or more items of personal property 22 are located at a first location L1. The items of personal property 22 may vary. As illustrated, one of the items comprises a refrigerator 24 and another item comprises a television 26. The personal property 22 might comprise other electronics or electronic devices such as, but not limited to, a toaster, blender, oven, microwave, dishwasher or other kitchen appliance; computing or telecommunication devices such as a computer, phone, PDA, tablet, etc., other household electronics or appliances such as washers, dryers, VCRs, DVD players, etc. The personal property 22 could also include non-electronic items such as furnishings, household goods, clothing, etc., so long as those goods are capable of providing the functionality as described below. The personal property 22 could also include vehicles and other forms of transportation and equipment.

The one or more first locations L1 might comprise, for example, a person's home or a business office, among other places.

In a preferred embodiment, information is exchanged between the personal property 22 and one or more tracking systems or devices 30. The tracking system 30 may comprise, for example, one or more servers 32 and one or more associated work stations 34 or other associated devices. The one or more tracking systems 30 are preferably located at a second location L2. The second location L2 may be remote from the first location L1. For example, the tracking system 30 may be operated by a lender, such as a bank or the like, and thus be located at the lender's location.

Information regarding the personal property 22 may be collected by or provided to the tracking system 30 in various manners. In one embodiment, information is exchanged between the personal property 22 and one or more reporting devices 28, and the reporting devices 28 then provide or communicate information to the tracking system 30. In a preferred embodiment, the reporting device 28 comprises a computing device, such as a desktop or laptop computer, tablet, phone, PDA, or the like.

As described in more detail below, the reporting devices 28 are configured to collect information regarding one or more items of personal property 22 and report information regarding the personal property 22 (e.g. transmit information) to the tracking system 30. This reporting, as well as any requests or information transmitted from the tracking system 30 to the reporting devices 28, is transmitted over one or more communication links 36. These communication links may be wired, wireless or a combination thereof, comprise or include local or wide area networks (LANs or WANs), and be public and/or private. For example, the communication link 36 might comprise or include the Internet.

Additional details of the invention will be described with reference to FIG. 2. In a preferred embodiment, each item of personal property 22 includes at least one communication interface 100. The communication interface 100 is configured to, at a minimum, transmit information to a remote location or device. In one embodiment, the communication interface 100 is configured to transmit and receive information.

The communication interface 100 may be configured to transmit and receive information over a wired or wireless communication link, and may be configured transmit information or data in various formats in accordance with various protocols. In the preferred embodiment of the invention, the communication interface 100 is configured to transmit information wirelessly. The communications interface 100 might communicate data by 3G, 4G, IMT, GSM or the like, or by TCP/IP, Bluetooth, 802.11xx and the like.

In one embodiment, the communication interface 100 may include or be associated with a controller 102. The controller 102 may be configured to generate response information, communicate with other devices, and receive input and the like. The controller 102 might comprise hardware and/or software, such as comprising a processor having an associated memory for storing data and/or machine executable program code.

In one embodiment, the controller 102 and communication interface 100 may be part of an existing device. For example, a television may include a controller 102 for controlling the various functions thereof and a communication interface 100 for transmitting and/or receiving data. In a preferred embodiment, as described in detail below, the controller 102 is configured to generate identification information which is transmitted by the communication interface 100.

In one embodiment of the invention, information regarding one or more items of personal property 22 is collected by at least one reporting device 28. As indicated above, the reporting device 28 might comprise, for example, a home laptop or desk top computer or other computing device such as a tablet, PDA or the like.

As illustrated in FIG. 2, the reporting device 28 may comprise a computing device (such as a laptop or desktop computer or a phone/PDA/tablet) which includes a processor 104 for executing instructions, a memory for storing data such as instructions 106, and at least one communication interface 108. The communication interface 108 is preferably configured to receive data or information from the items of personal property 22, such as transmitted by the communication interface 100 thereof. In addition, the communication interface 108 is configured to transmit information to and/or receive information from one or more other devices, and particularly the one or more tracking systems 30. As a result, while the communication interface(s) 108 of the reporting device 28 may communicate via wired or wireless links and using a variety of communication protocols, preferably the communication interface(s) 108 are configured to provide compatible communications with those devices. For example, in one embodiment, the communication interface 108 might include a wireless communication interface which permits the reporting device 28 (such as the computer) to communicate directly with a wireless network or the like. In other embodiments, such as illustrated in FIG. 1, the communication interface 108 might send information to and receive information from various other devices, such as communication interfaces or devices 38 such as a wireless access point or router 38 (which devices in turn communicate via one or more other devices or communication links to the tracking system 30).

Communications may be established between the items of personal property 22 and the reporting device 28 in various manners. For example, an electronic device such as television, DVD player, refrigerator or the like may include a wireless communication interface. Via a menu of the device, the user of the device may search out other devices or networks, such as to place the device in wireless communication with those devices or networks. As one example, a user might have a wireless home network having one or more wireless access points, routers, switches or the like, and other associated devices. By connecting the electronic device to such a network, the device may be placed in communication with the user's computer (or other reporting device). In other configurations, the devices might be directly linked (in peer to peer configuration).

As described below, the reporting device 28 may include computer executable code or "software" in the form of a collateral reporting application. The collateral reporting application may comprise software which is stored on a memory associated with the processor 104, so as to be executable by the processor 104. For example, such a collateral reporting application may be downloaded or installed on a desktop or laptop computer, a phone/PDA/ tablet or other type of computing device. The application may be configured to facilitate transmission of information received from the items of personal property 22 by the reporting device 28 to the tracking system 30 and/or to permit the tracking system to communicate with the reporting device 28 or the items of personal property associated or in communication therewith. Alternatively, such an application may be run via a web browser or the like, as described below.

The tracking system 30 preferably comprises at least one computing device, such as a server 32. The at least one server 32 may comprise a processor for executing instructions and a memory for storing data such as instructions, borrower data, collateral data and/or other information. The tracking system 30 also preferably comprises at least one communication interface 110. The communication interface 110 is configured to transmit and/or receive data or information, such as exchanged with one or more reporting devices 28 (and/or the collateral or other devices).

The tracking system 30 may include software for implementing various features of the invention. For example, the software may be configured to facilitate storage of information regarding consumer collateral (such as provided by a consumer via an application or polling, as described below). The software may also be configured to facilitate a comparison of collected collateral information to that stored information to verify the collateral, as also described below. In one embodiment, the software may be configured to receive collateral information from the items of personal property 22 and/or to send signals or requests for information regarding items of personal property 22, as described below. In one embodiment of the system, the reporting devices 28 may act or serve as clients to the tracking system 30, such as in a thin client environment where the reporting device 28 serves as an interface to the tracking system 30 and the software for implementing the system is executed at the tracking system 30 (for example, as indicated above, the reporting device 28 might include a web browser which serves as an interface to and communicates with the tracking system 30 via the software run at the tracking system 30).

In another embodiment of the invention, information regarding personal property 22 might be provided to the tracking system 30 without a reporting device 28, such as directly through a communication interface or device 38, such as a router and/or wireless access point or the like. For example, as illustrated in FIG. 1, a user might have a router with wireless communication capabilities or a wireless access point and a separate router, or similar devices. These devices may communicate with the one or more items of personal property 22 directly (i.e. without computing device as the interface, including when a home or laptop computer, etc. is not turned on). In such a configuration, the information received from the items of personal property 22 may be transmitted through those devices 38 (acting as "reporting devices") to the tracking system 30 and/or those devices may receive information from the tracking system 30. As detailed below, in such a configuration, the communication device or interface 38 may facilitate communications from the items of personal property 22 to the tracking system 30 and/or vice versa, such as through a communication port of the device.

In one embodiment, as illustrated in FIG. 1, the tracking system 30 may include one or more workstations or other devices. These stations or devices may enable users to interface with the server(s) 32, such as to generate reports, view information, input queries or information or engage in other tasks.

Additional aspects of the system 20 of the invention will be appreciated from a description of methods of the invention. One embodiment of a method of the invention will be described with reference to FIG. 3. This method is described primarily with reference to a configuration of a system where a desktop or laptop computer or the like is used as a reporting device 28.

In accordance with one embodiment of the invention, a borrower may seek a loan from a lender. The loan might comprise money (represented physically, e.g. by currency, or electrically). In order to grant the loan, the lender may require that the borrower identify collateral which belongs to the borrower, which collateral might be levied upon by the lender if the borrower does not pay the loan in accordance with the terms thereof. In accordance with the invention, the system of the invention may be used to facilitate processing of the loan and tracking of associated personal property.

In a step S1, the borrower may apply for a loan. In one embodiment, this may comprise the borrower providing loan information to a lender. The loan information may comprise information which identifies the borrower (name, address, social security number, phone number, email address, birth date and/or other information) and other information, such as employment information, income information and/or other information as desired by the lender. The information might be provided aurally, in writing (such as by filling out a paper form) or electronically (such as by filling out an on-line loan application).

In order to approve the loan, the lender may require that the borrower identify collateral to be used to secure all or a portion of the loan. In a step S2, the borrower may identify various forms of collateral such as monies (retirement accounts, savings, etc.), securities (stocks, bonds), real property (land, house) and/or personal property. The lender might only accept certain forms of property as collateral, such as certain types of personal property (such as electronics but not clothing, etc.). The borrower might identify personal property by general description or by detailed information such as model number, serial number, etc.

If the lender approves the use of personal property as collateral, the lender may require that the borrower allow the lender to track that personal property. In one embodiment, the borrower may install a collateral reporting application on their reporting device, as in a step S3. For example, in one configuration a borrower might download the collateral reporting application to their home or personal computer. In a preferred embodiment, the collateral reporting application is configured to be executed by the reporting device and cause the reporting device to collect information from one or more items of personal property and report information to the tracking system.

In a preferred embodiment, the reporting device is configured to collect information regarding items of personal property which are associated with the reporting device. For example, in one configuration a borrower may place one or more items of personal property in communication with their reporting device. This might comprise, for example, establishing a wireless communication link between the item of personal property and the reporting device. As one example, a borrower might link their television or other electronic appliance to their home computer (such as via a wireless home computing network). Of course, it is possible for the borrower to place the items of personal property in communication with the reporting device via wired links, such as via a wired Ethernet connection or the like.

In a preferred embodiment, the reporting application is configured to gather or obtain information about the items of personal property, as in step S4. The reporting application could cause the reporting device to poll the items of personal property for information, such as to cause a signal to be sent to the controller of those items which causes the controllers to send back response information. In other embodiments, the reporting application could simply gather information which is received by the reporting device from those items of personal property which are placed in communication with the reporting device. For example, in some cases, when a borrower registers or places an item of personal property in communication with the reporting device, the devices may automatically exchange information which includes information about the item of personal property (such as the model and/or serial number of the item of personal property, whereby the reporting application may then gather that existing information).

In a preferred embodiment, in a step S5, the tracking system gathers information regarding the borrower's collateral, such as the items of personal property. In one embodiment, the tracking system may send a request for information to the reporting device or through the reporting device to the items of collateral. In another embodiment, the reporting device may automatically send information regarding personal property to the tracking system.

As one example, when a borrower installs the reporting application, the collateral reporting application may automatically gather information regarding all personal property which is in communication with the reporting device. The reporting application may then automatically send a report of the located personal property to the tracking system. In another embodiment, the reporting application may report to the tracking system that it is has been installed on the borrower's reporting device and the tracking system may then request that the reporting application look for certain personal property.

The tracking system may be configured to verify the personal property against the collateral identified by the borrower, as in step S6. For example, a borrower may identify "Samsung TV model XYZ, serial no. 455" and "Whirlpool refrigerator model ABC, serial no. 123" as collateral on their loan application. As such, the tracking system may either compare the personal property reported to it by the borrower's reporting device or may send a request for confirmation of the identified collateral to the reporting device.

In a step S7, it is determined if any of the collateral which the borrower has identified and which forms the collateral for the loan is missing. If so, then in a step S8, the lender may contact the borrower, such as to inquire what happened to the collateral. If the borrower cannot verify the collateral, the lender might require that the borrower immediately pay the balance of the loan in full.

If the collateral is verified in step S7, then the process of checking the collateral, such as in steps S4-S6, may be repeated. For example, the process of checking for the collateral and verifying the collateral might be performed at specific time intervals (e.g. each day, each hour, etc.), at irregular time intervals, or continuously. As one example, the reporting device (and associated collateral application) might be configured to register the associated personal property. In the event any of the items of personal property (or at least ones designated to be collateral for the loan) are disassociated from the reporting device, then the reporting device might automatically report that event to the tracking system. The process of verifying the collateral may continue until the term of the loan or the loan balance is paid.

Figure 3:
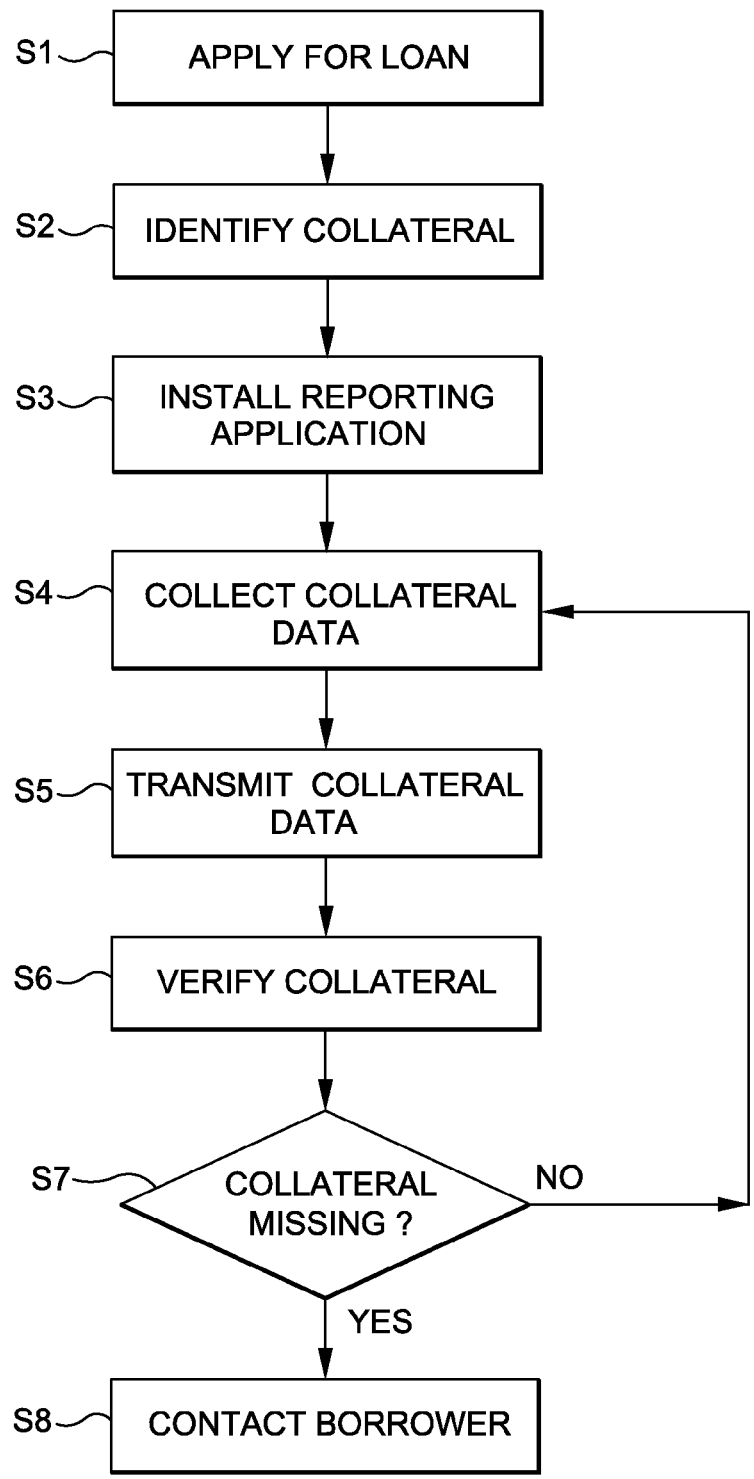
FIG. 3 is a flow diagram of a method in accordance with one embodiment of the invention.

It will be appreciated that the method illustrated in FIG. 3 is simply one example of a method of the invention and the steps thereof need not be performed in that specific order and/or that other steps may be performed. Further, the invention may have other features or elements.

For example, as described above, in one embodiment of the invention the exchange of information may be facilitated by a reporting device, such as using an application which runs on a computing device of the user. However, one drawback to such a configuration is that a user might turn their computer off from time to time. When the computer is turned off, tracking or reporting to the tracking system 30 would cease.

As described above, in another configuration of the invention, communications might occur between the items of personal property 28 and the tracking system 30 via one or more communication devices or interfaces 38, such as a router. For example, items of personal property 22 might communicate wirelessly with a wireless interface of a router, or with a wireless access point which is coupled to a router (where the router then serves as a communication interface to one or more communication links/remote systems or devices). In such a configuration, the communication device 38 may be configured to permit communication with the items of personal property 22 and/or the tracking system 30. For example, a user might configure a port of their router (such as via security or access settings) to permit the tracking system 30 to link to the items of personal property 22 via the router (which would otherwise generally operate as a firewall to prevent those communications). In other embodiments, a user might provide an IP address and password (or other access information) which are used by the tracking system 30 to contact the router 38 and then gain access through the router to the items of personal property 22. In yet other embodiments, the items of personal property 22 might be configured so that they request that the router 38 permit communications with the tracking system 30, such as to permit the personal property 22 to send out signals to the tracking system 30 (although such a configuration may require alteration of the software associated with the item of personal property from its normal, manufacturer supplied software). As indicated above, these configurations have the advantage that the tracking system 30 can track the items of personal property 22 via the one or more communication interfaces or devices 38, rather than via a reporting device 28.

As another aspect of the invention, the tracking system 30 may identify the IP address of the user's computing device or communication interface or device. The tracking system 30 may utilize the IP address to determine a general geographic location of those devices, and thus the associated items of personal property 22. This information may be compared to the user's address as further verification of the location of the personal property and its association with the user. For example, a consumer might indicate on a loan application that their address is in Las Vegas, Nev. However, the tracking system 30 may determine from IP address information that the item of personal property is located near St. George, Utah. This discrepancy may be flagged, such as to contact the consumer to confirm their address and/or determine why the personal property is not at the consumer's address.

In one embodiment of the invention, locking software might be installed on items of personal property and/or a locking instruction or signal might be transmitted to items of personal property 22 to prevent use of the item(s) if their location is not confirmed. First, software might be installed (originally, by downloading or the like) on the item of personal property 22 which enables locking functionality. In one embodiment, the software may cause the item of personal property 22 to cease normal operation (shut down, disable certain features, etc.), provide a notice/warning to the user, or the like, in the event the item of personal property 22 does not communicate with the tracking system 30 or does not receive a confirmation signal from the tracking system 30 (thus indicating that the item of personal property 22 is not properly reporting to the tracking system 30, such as if the item of personal property 22 is moved out of range of the user's computer/network, the user shuts of their computer/network, etc. For example, in one embodiment, the locking software might be configured to lock the item of personal property if the software does not receive a signal from the tracking system 30 during certain time intervals (each hour, day, week, etc.). In the event the item of personal property 22 includes at least one display, the display could be configured to display a warning to the user, instructions for how to unlock the item, etc. For example, a television could display a message such as "check your computer network: we have not received reporting from your television as required by your collateral agreement . . . ".

The invention has particular applicability to items of personal property which include built-in communication devices, and most preferably wireless communication interfaces or devices. This personal property may include, for example, televisions, DVD players, refrigerators and other electronics which are produced with integrated communication devices which allow those devices to communicate with computers or computer networks (including communication devices/interfaces). Such devices may, for example, be placed in communication with an owner's home wireless computing network (such as a wireless access point, router and/or associated devices such as home computers, etc.). A particular advantage of this aspect of the invention is that an item of personal property can be identified and tracked without the need to attach a separate tracking device, tag or the like. Instead, the item can be tracked using the inherent capabilities of the item.

In accordance with the invention, because the tracking system can "see" items of personal property, those items can be used as collateral for a loan because the collateral can be remotely tracked by the lender. If any of the items of collateral are disassociated from the tracking system, then that event can be reported to the lender. For example, a borrower's television may be utilized as collateral and may be placed in communication with the borrower's computer or router (which in turn reports the collateral to the tracking system). If television and the borrower's computer or router communicate via a wireless connection and the borrower takes the television out of range of the borrower's computer or router/wireless network (such as if the borrower sells the television to another party and that part moves the television to a different location), the loss of the collateral (because it can no longer be "seen" by the user's computer) can be reported to or detected by the tracking system). As another example, if the borrower placed the television in communication with their computer or router via a wired communication link (such as an Ethernet cable) and then moved the television (including disconnecting the cable), then this event could again be detected or reported to the lender.

As one aspect of the invention, instead of having a borrower identify items of personal property on a loan application, the lender might "poll" the borrower's computer, router or other reporting device for associated personal property which could be used as collateral. For example, a borrower might fill out a loan application online via their home computer, where their computer communicates with the tracking system. During the application process, the tracking system may poll the user's computer to identify all associated devices. This polling process can be used to gather information regarding the various associated devices and then be used by the lender to identify the preferred items to be used as collateral. During the application process the user might provide access information (such as network, computer or router passwords or other information), such as to enable communication between the tracking system 30 and the items of personal property 22.

In one embodiment, various databases of information may be generated regarding borrowers, loans and/or collateral. For example, a lender may generate or create an account when a borrower fills out a loan application. That account and associated data may be stored in one or more memory devices which are accessible by the tracking system (such as the server(s)). Data may be associated with the borrower's account, such as the borrower's contact information and the like. Likewise, information may be associated with the borrower's account which identifies the borrower's collateral. As indicated, this information might be obtained by polling the borrower's computer, router or the like for associated devices and, for example, obtaining information regarding the manufacturer, model, serial number and/or other information regarding the collateral.

It will be appreciated that the system of the invention may be used to track the collateral of multiple borrowers. For example, a single tracking system could be used to communicate with the reporting devices of a plurality of borrowers. In this manner, the collateral verification by a lender as to multiple borrowers can be integrated and automated.

In one embodiment, the invention may be implemented via a reporting application which is installed on the borrower's computing device or via interface with a computer, communication interface or device or the like. Of course, the invention might be implemented in various other manners.

In one embodiment, the borrower's reporting device may be configured to periodically contact the tracking system to report the collateral, or might be configured to contact the tracking system only if an item of collateral is no longer detected. In an alternate configuration, the tracking system may poll the reporting device for collateral verification. In another embodiment, the tracking system may be configured to receive signals which are periodically transmitted from collateral (for example, an item of collateral might be configured to periodically send a signal which seeks a software update from the manufacturer or the like and the tracking system 30 may detect that signal as a means for determining the existence of the collateral).

It will be appreciated that the reporting application, reporting device and/or tracking system may be configured to track only the items of personal property which are used as collateral. For example, a borrower might have a television and a DVD player linked to their home computer or communication interface/device, but only the television might be used as collateral for a loan. In such a configuration, the tracking system may poll the borrower's computer or send a request through a communication interface/device for just the television and/or the borrower's computer might be configured to report that the television is still connected (or is no longer detected), but not report the DVD player.

As indicated herein, the system and method of the invention have particular utility to tracking of collateral for loans, it could be used for various purposes. For example, instead of using the system to track collateral which is used as security for a general loan, the system could be used to track a particular item of personal property which has been purchased on credit. For example, a borrower might purchase a refrigerator on credit. The system of the invention might be used to track the refrigerator during the period of time that the borrower is paying off the refrigerator, thus making sure that the borrower does not sell, destroy, etc., the purchased item until it has been paid. The system could also be used to track personal property for insurance or other purposes.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system for tracking personal property of an owner which is used as collateral for a loan comprising:
   an item of personal property, said item of personal property having a built-in communication interface;
   a computing device of said owner, said computing device having a processor, a memory and a communication interface permitting said computing device to communicate with said item of personal property via said built-in communication interface thereof;
   a downloaded software application stored in said memory of said computing device of said owner and configured, when executed by said processor to cause said computing device to:
      send a polling request to said item of personal property via said built-in wireless communication device thereof;
      generate an output regarding said polling request; and
      transmit said output to at least one external server; and
   said at least one external server comprising a processor, a memory and machine-readable code stored in said memory and executable by said processor to cause said server to:
      analyze said output received from said computing device to determine a status of said item of personal property.

2. The system in accordance with claim 1 wherein said output comprises information regarding a response to said polling request from said item of personal property.

3. The system in accordance with claim 2 wherein said information includes a serial number of said item of personal property.

4. The system in accordance with claim 2 wherein said information comprises make and/or model information regarding said item of personal property.

5. The system in accordance with claim 3 wherein said machine-readable code stored in said memory and executable by said processor of said server is configured to analyze said output by comparing said serial number to one or more serial numbers stored in a collateral database associated with said server.

6. The system in accordance with claim 2 wherein said output includes an IP address of said computing device of said owner.

7. The system in accordance with claim 4 wherein said machine-readable code stored in said memory and executable by said processor of said server is configured to analyze said output by comparing a location corresponding to said IP address to an address of said item of personal property.

8. The system in accordance with claim 1 wherein said polling request is sent periodically.

9. The system in accordance with claim 1 wherein said built-in communication interface of said item of personal property comprises a wireless communication interface.

10. The system in accordance with claim 9 wherein said computing device of said owner and said item of personal property communicate via one or more wireless access points.

11. A method of tracking an item of personal property of an owner, the item of personal property having a built-in wireless communication interface, which item of personal property is used as collateral to secure a loan, comprising the steps of:
   receiving a request from said owner via a computing device of said owner which is in communication with said item of personal property at one or more times via said built-in wireless communication interface, said request comprising a request for a personal property tracking application comprising downloadable software for execution by a processor of said computing device;
   transmitting said downloadable software application from at least one server to said computing device;
   causing, via said downloadable software application executed by said processor of said computing device, said computing device to poll said item of personal property by transmitting a polling request to said item of personal property via said built-in wireless communication interface thereof;
   receiving at said at least one server, information regarding a response from said item of personal property transmitted by said computing device; and
   analyzing at said at least one server said information regarding said response to confirm the status of said item of personal property as collateral.

12. The method in accordance with claim 11 wherein said information includes a serial number of said item of personal property.

13. The method in accordance with claim 11 wherein said information comprises make and/or model information regarding said item of personal property.

14. The method in accordance with claim 12 wherein said step of analyzing comprises comparing said serial number to one or more serial numbers stored in a collateral database associated with said at least one server.

15. The method in accordance with claim 11 wherein said information includes an IP address of said computing device.

16. The method in accordance with claim 15 wherein said step of analyzing comprises comparing a location corresponding to said IP address to an address of said item of personal property.

17. The method in accordance with claim 11 comprising transmitting said polling request periodically.

18. The method in accordance with claim 11 wherein said computing device and said item of personal property communicate via one or more wireless access points.

19. The method in accordance with claim 11 wherein said information regarding said response comprises at least a serial number received from said item of personal property and further comprising receiving at said at least one server an IP address of said computing device, and wherein said step of analyzing comprises comparing said serial number received from said item of personal property to a confirmatory serial number stored in at least one database associated with said server and said step of analyzing comprises comparing a location corresponding to said IP address to an address stored in said at least one database at which item of personal property is designated to be located.

* * * * *